(12) United States Patent
Romaniuk

(10) Patent No.: US 6,483,614 B1
(45) Date of Patent: Nov. 19, 2002

(54) COUPLER-BASED PROGRAMMABLE PHASE LOGIC DEVICE

(76) Inventor: Charles Christopher Romaniuk, Box 3295, Vermilion, Alberta (CA), T9X 2B2

(*) Notice: Subject to any disclaimer, the term of this patent is extended or adjusted under 35 U.S.C. 154(b) by 1 day.

(21) Appl. No.: 09/671,970

(22) Filed: Sep. 29, 2000

(51) Int. Cl.[7] .................................................. G02F 3/00
(52) U.S. Cl. ........................ 359/108; 359/577; 327/355
(58) Field of Search ................................ 327/355–361; 359/107, 108, 333, 577; 455/326

(56) References Cited

U.S. PATENT DOCUMENTS

| | | | |
|---|---|---|---|
| 5,093,802 A | 3/1992 | Hait | |
| 5,410,625 A | 4/1995 | Jenkins et al. | |
| 5,555,126 A | 9/1996 | Hait | |
| 5,644,123 A | 7/1997 | Hait | |
| 6,128,110 A | * 10/2000 | Bulow | ........................ 359/108 |

OTHER PUBLICATIONS

Mano, M.M. (1991). "Digital Design" (2nd ed.) Englewood Cliffs, NJ: Prentice Hall. pp.28–29.

Stremler, F.G. (1990). "Introduction to Communication Systems" (3rd ed.). Reading, MA. Addison–Wesley Publishing Company. pp. 618–619.

* cited by examiner

*Primary Examiner*—Kenneth B. Wells
*Assistant Examiner*—Cassandra Cox

(57) ABSTRACT

A coupler-based programmable phase logic device operates using coherent optical or microwave signals. The device is composed of a mixing stage and a logic stage and utilizes 3-port and 4-port couplers, such as integrated optic non-3dB Y-branches and integrated optic directional couplers. The device receives two coherent data input signals and three coherent control input signals and produces a coherent phase modulated data output signal. The data input signals are externally phase modulated to have one of two relative phase values, as in the binary phase shift keying (BPSK) method The data output signal is a phase modulated signal having one of the two relative phase values that is related to the phase values of the data input signals by a Boolean logic function, such as OR, AND, NAND, or NOR. The control input signals determine the logic function performed by the device and can be changed dynamically for dynamic device operation.

26 Claims, 6 Drawing Sheets

$X = I\sin(\omega t + kx)$ $Y = I\sin(\omega t + kx + \pi)$

COUPLER-BASED PROGRAMMABLE PHASE LOGIC DEVICE

CROSS-REFERENCE TO RELATED APPLICATIONS

Not Applicable

STATEMENT REGARDING FEDERALLY SPONSORED RESEARCH OR DEVELOPMENT

Not Applicable

Reference to a "Microfiche appendix"

Not Applicable

BACKGROUND OF THE INVENTION

1. Field of the Invention

The present invention relates generally to phase logic devices and relates specifically to logic gates operating with no active components and performing logic primarily using the phase of a signal.

2. Discussion of Related Art

The field of optics is expanding at a phenomenal rate. Many types of devices for controlling optic signals have been developed. Optical devices are replacing a variety of electronic functions and optical logic gates are one of the most important areas of development in optical computing.

Logic gates using a combination of electronics and optics have been developed; however, these devices are limited in speed by the electrical-optical interaction. All-optical logic devices are preferable because they are capable of much higher operating speeds.

A variety of physical phenomena has been exploited to create all-optical logic gates, but phase effects and beam interference have provided some of the simplest and fastest methods yet.

Several phase logic devices exist; however, they require feedback or special filtering to operate. They also have not taken advantage of the simple optic components that are currently available.

In U.S. Pat. No. 5,555,126, Hait describes a special phase interference technique that transmits all input energy to an output signal. He also describes an AND phase logic gate that requires a feedback signal. The feedback signal adds extra transmission time to the phase logic gate and creates a more complex operation. He also does not describe how the phase logic gate can be made from available technology and components.

In U.S. patent application Ser. No. 09/522,912, assigned to the assignee of the present application, a special filtering method that uses a threshold device is described. A phase logic device that employs the special threshold filtering method is also described. However, threshold devices are special optical components that have not yet been developed to full economic viability on a mass production scale.

A simple and versatile phase logic device that uses commonly available and easily manufacturable components would be economically viable immediately and is needed to further advance the optical computing cause.

It is, therefore, an object of the present invention to provide a logic device that fulfills the above mentioned deficiencies.

BRIEF SUMMARY OF THE INVENTION

A coupler-based programmable phase logic device is a phase logic device that is composed of signal combiners. The device can be used with any coherent signals, in particular, optic beams, such as laser beams, or microwave signals, such as maser beams. The device uses only 3-port couplers and 4-port couplers. Control input signals determine the logic function performed by the device and can be changed dynamically for dynamic and programmable device operation.

The device receives two coherent data input signals and three coherent control input signals and produces a coherent phase modulated data output signal. The two data input signals are externally phase modulated to have one of two phase values, as in the binary phase shift keying method. The data output signal is a phase modulated signal having one of the two phase values that is related to the phase values of the data input signals by a Boolean logic function, such as AND or OR.

The device is composed of a mixing stage and a logic stage. The data input signals are directed into a mixing stage which produces two intermediate signals. The intermediate signals are then directed into the logic stage which produces the data output signal.

The mixing stage consists of a cross-over section and a transferring section. The cross-over section facilitates an interaction between the data input signals and the transferring section applies two control input signals.

The logic stage consists of a combining section and a magnitude shifting section. The combining section combines the intermediate signals, and the magnitude shifting section modifies the magnitude of the data output signal with a third control input signal.

DETAILED DESCRIPTION OF THE INVENTION

Figure 1:
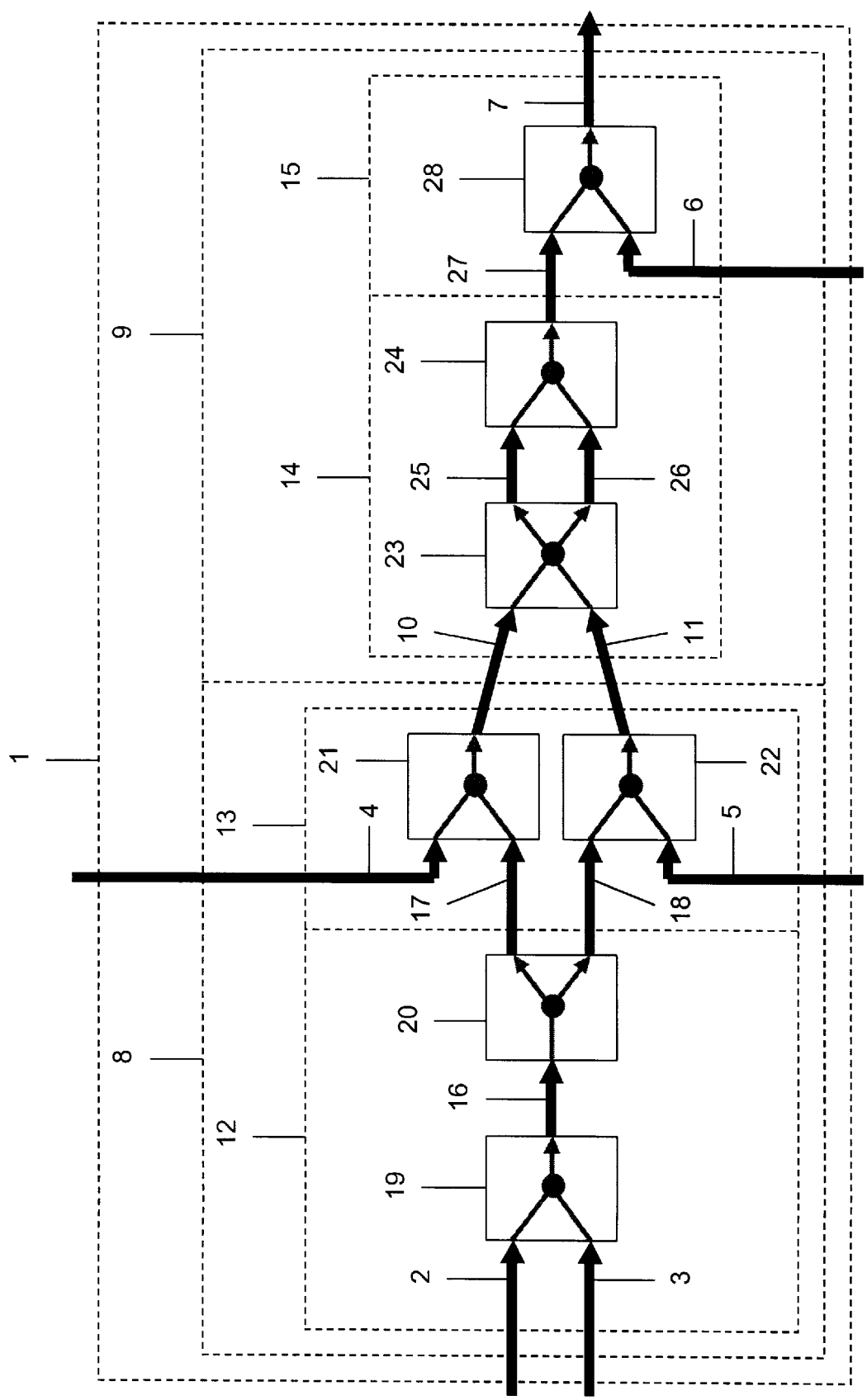
FIG. 1 shows a schematic of a coupler-based programmable phase logic device.

Referring to FIG. 1, a coupler-based programmable phase logic device 1 receives two coherent phase modulated data input signals 2, 3 and three coherent control input signals 4, 5, 6, and produces a coherent phase modulated data output signal 7. The device 1 is composed of a mixing stage 8 and a logic stage 9. The data input signals 2, 3 are directed into the mixing stage 8 which produces two intermediate signals 10, 11. The intermediate signals 10, 11 are then directed into the logic stage 9 which produces the data output signal 7.

The mixing stage 8 consists of a cross-over section 12 and a transferring section 13. The cross-over section 12 combines the data input signals 2, 3 producing a merged signal 16 and then splits the merged signal 16 to produce two cross-over signals 17, 18. The transferring section 13 uses the first two control input signals 4, 5 to alter the magnitudes of the two cross-over signals 17, 18 and produces the two intermediate signals 10, 11 that are either equal in magnitude or only one signal is non-negligible.

The logic stage 9 consists of a combining section 14 and a magnitude shifting section 15. The combining section 14 combines the intermediate signals 10, 11 to produce a combined signal 27. The magnitude shifting section 15 modifies the magnitude of the combined signal 27 using the third control input signal 6 to produce the data output signal 7.

The following description of the form and operation of the coupler-based programmable phase logic device 1 is illustrated by way of example only.

First Embodiment

Figure 2:
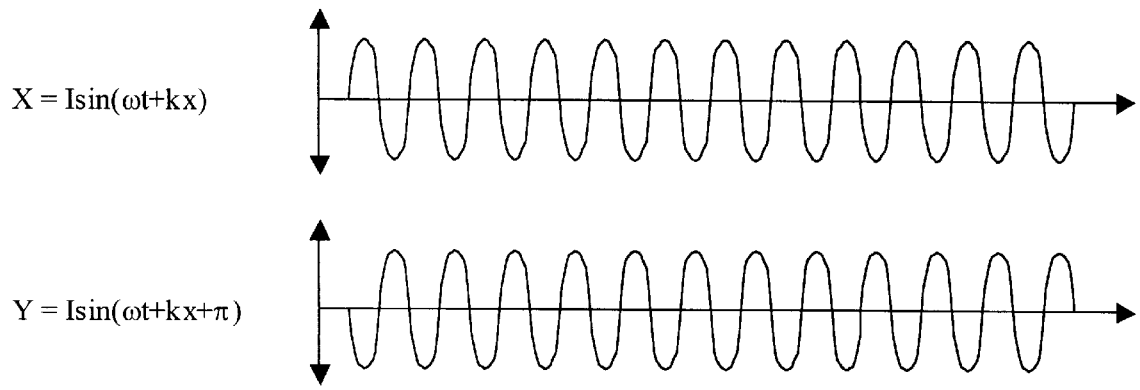
FIG. 2 shows example waveforms of inputs and outputs to the device of FIG. 1.

The data input signals 2, 3 are two coherent signals, such as laser beams, with the same substantially fixed frequency, polarization, and magnitude and can be pulsed or continuous signals. The data input signals 2, 3 are externally modulated to have only one of two relative phase values, either equal phase or opposite phase. The two phase values can be represented by $$X = I\sin(\omega t + kx) \text{ and } Y = I\sin(\omega t + kx + \pi)$$

as shown in FIG. 2, where the signal magnitude is an arbitrary relative measure in units of I. For example, the data value 1X represents a waveform of phase X (0° relative phase shift) with a magnitude of 1I. Corresponding digital logic values of the data input signals are represented in this example by the convention 1X=OFF and 1Y=ON which is based on the binary phase shift keying (BPSK) method. Table 1 shows the four possible combinations, or states, of the data input signals 2, 3 for the device 1 in this example.

TABLE 1

| First Data Input Signal 2 | | Second Data Input Signal 3 | |
|---|---|---|---|
| 1X | OFF | 1X | OFF |
| 1X | OFF | 1Y | ON |
| 1Y | ON | 1X | OFF |
| 1Y | ON | 1Y | ON |

Stage 1—Mixing Stage

The two data input signals 2, 3 are directed into the cross-over section 12 of the mixing stage 8. The cross-over section 12 is composed of two 3-port couplers 19, 20 which are used to combine the data input signals 2, 3 and then to split the resulting merged signal 16 to produce the two cross-over signals 17, 18.

Figure 3:
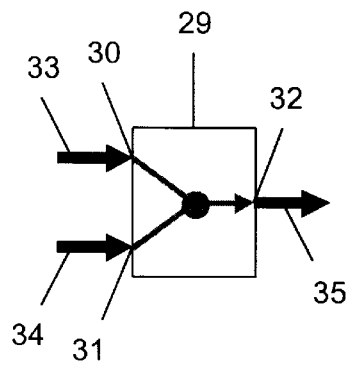
FIG. 3 is a schematic of a 3-port coupler of FIG. 1.

3-port couplers, such as integrated optic non-3dB Y-branches or waveguide splitter/combiners, as described in U.S. Pat. No. 5,410,625, are known in the art and are commonly available. A 3-port coupler 29, shown in FIG. 3, utilizes two input ports 30, 31 and one output port 32. The 3-port coupler 29 is used for signal combining or, in reverse, for signal splitting. The 3-port coupler 29, operating as a combiner, preferably arithmetically combines two input signals 33, 34 to produce an output signal 35. For example, the first input signal 33 of 2X and the second input signal 34 of no light combine to produce the output signal 35 of 2X, as shown in the fifth row of Table 2. Also, the first input signal 33 of 1X and the second input signal 34 of 1Y combine to produce the output signal 35 of no light, as shown in the second row of Table 2. Table 2 summarizes the example 3-port coupler 29 input signal combinations and the resulting preferred output signals that are relevant to the operation of the device 1 in this example.

TABLE 2

| First Input Signal 33 | Second Input Signal 34 | Output Signal 35 |
|---|---|---|
| 1X | 1X | 2X |
| 1X | 1Y | 0 |
| 1Y | 1X | 0 |
| 1Y | 1Y | 2Y |
| 2X | 0 | 2X |
| 2Y | 0 | 2Y |
| 0 | 2X | 2X |
| 0 | 2Y | 2Y |
| 2X | 2X | 4X |
| 2X | 2Y | 0 |
| 2Y | 2X | 0 |
| 2Y | 2Y | 4Y |
| 4X | 2Y | 2X |
| 4Y | 2X | 2Y |
| 0 | 4X | 4X |
| 0 | 4Y | 4Y |

In the cross-over section 12 in FIG. 1, the first 3-port coupler 19 functions as a combiner to combine the two data input signals 2, 3 producing the merged signal 16. The first data input signal 2 is directed into the first input port of the first 3-port coupler 19 and the second data input signal 3 is directed into the second input port of the first 3-port coupler 19 and the merged signal 16 is produced at the output port of the first 3-port coupler 19. Table 3 summarizes the input and output signals of the first 3-port coupler 19 functioning as a signal combiner.

TABLE 3

| First Data Input Signal 2 | Second Data Input Signal 3 | Merged Signal 16 |
|---|---|---|
| 1X | 1X | 2X |
| 1X | 1Y | 0 |
| 1Y | 1X | 0 |
| 1Y | 1Y | 2Y |

The merged signal 16 is then directed into the input port of the reversed second 3-port coupler 20, such as an integrated optic Y-branch or a waveguide splitter/combiner, as described in U.S. Pat. No. 5,410,625, which functions as a signal splitter. The reverse 3-port coupler is well known in the art and is widely used. The reverse 3-port coupler has one input port and two output ports, operates as a splitter, and preferably divides an input signal into two equal output signals. For example, an input signal of 2X is split to produce two equal output signals of 1X.

In the cross-over section 12, the second 3-port coupler 20 produces the two cross-over signals 17, 18. Table 4 summarizes the input and output signals of the second 3-port coupler 20 operating as a signal splitter.

TABLE 4

| Merged Signal 16 | First Cross-Over Signal 17 | Second Cross-Over Signal 18 |
|---|---|---|
| 2X | 1X | 1X |
| 0 | 0 | 0 |
| 0 | 0 | 0 |
| 2Y | 1Y | 1Y |

The cross-over signals 17, 18 are then directed into the transferring section 13 of the mixing stage 8. Each of the cross-over signals 17, 18 is combined with the first and second control input signals 4, 5, respectively, using a third 3-port coupler 21 and a fourth 3-port coupler 22 to produce the two intermediate signals 10, 11.

The first control input 4 is directed into the first input port of the third 3-port coupler 21 and the first cross-over signal 17 is directed into the second input port of the third 3-port coupler 21 where they are combined to produce the first intermediate signal 10.

The second cross-over signal 18 is directed into the first input port of the fourth 3-port coupler 22 and the second control input 5 is directed into the second input port of the fourth 3-port coupler 22 where they are combined to produce the second intermediate signal 11.

The control input signals 4, 5 are constant data value signals that are preferably equal in magnitude, and opposite in phase, to each other. The control input signals 4, 5 are also preferably equal in magnitude to the data input signals 2, 3. The resulting logic function of the device 1 is determined by the selection of the data values of the control input signals 4, 5. For example, if the first control input signal 4 is selected as 1X and the second control input signal 5 is selected as 1Y, the device 1 will perform an OR logic function. Table 5 summarizes the input and output signals of the third 3-port coupler 21 for an OR logic function.

TABLE 5

| First Control Input 4 | First Cross-Over Signal 17 | First Intermediate Signal 10 |
|---|---|---|
| 1X | 1X | 2X |
| 1X | 0 | 1X |
| 1X | 0 | 1X |
| 1x | 1Y | 0 |

Table 6 summarizes the input and output signals of the fourth 3-port coupler 22 for an OR logic function.

TABLE 6

| Second Cross-Over Signal 18 | Second Control Input Signal 5 | Second Intermediate Signal 11 |
|---|---|---|
| 1X | 1Y | 0 |
| 0 | 1Y | 1Y |
| 0 | 1Y | 1Y |
| 1Y | 1Y | 2Y |

Stage 2—Logic Stage

The two intermediate signals 10, 11 are then directed into the combining section 14 of the logic stage 9. The combining section 14 consists of a first 4-port coupler 23 followed by a fifth 3-port coupler 24.

Figure 4:
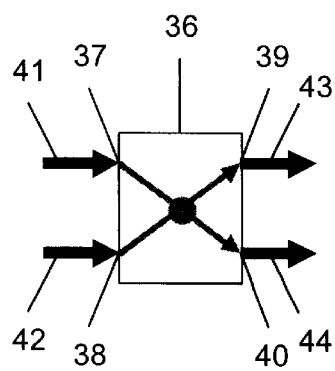
FIG. 4 is a schematic of a 4-port coupler of FIG. 1.

4-port couplers, such as integrated optic directional couplers, are well known in the art and are commonly used. A 4-port coupler 36, as shown in FIG. 4, has two input ports 37, 38 and two output ports 39, 40. The 4-port coupler 36, operating as a signal splitter, preferably divides a first input signal 41, directed into the first input port 37 with no second input signal 42 directed into the second input port 38, into two equal magnitude output signals 43, 44 of opposite phase. For example, the first input signal 41 of 2X is split into the first output signal 43 of 1X and the second output signal 44 of 1Y, as shown in the fifth row of Table 7.

Two input signals 41, 42 of opposite phase and equal magnitude are combined by the 4-port coupler 36 preferably to produce the first output signal 43 of no light at the first output port 39. The energy is not unused but is directed into the second output signal 44 at the second output port 40 preferably producing the second output signal 44 of twice the magnitude of the input signals 41, 42 and the same phase as the second input signal 42. For example, the first input signal 41 of 1X, directed into the first input port 37, and the second input signal 42 of 1Y, directed into the second input port 38, are combined to produce the first output signal 43 of no light at the first output port 39 and the second output signal 44 of 2Y at the second output port 40, as shown in the second row of Table 7.

Two input signals 41, 42 that are equal in phase are combined preferably to produce the first output signal 43 with the same phase and twice the magnitude of the input signals 41, 42 and the second output signal 44 of no light. For example, the first input signal 41 of 1X directed into the first input port 37 and the second input signal 42 of 1X directed into the second input port 38 are combined to produce the first output signal 43 of 2X at the first output port 39 and the second output signal 44 of no light at the second output port 40, as shown in the first row of Table 7.

As described by coupled mode analysis, an integrated optic directional coupler designed as a signal splitter can function as the specified 4-port coupler 36.

Table 7 summarizes the example 4-port coupler 36 input signal combinations and the resulting output signals that are relevant to the operation of the device 1 in this example.

TABLE 7

| First Input Signal 41 | Second Input Signal 42 | First Output Signal 43 | Second Output Signal 44 |
|---|---|---|---|
| 1X | 1X | 2X | 0 |
| 1X | 1Y | 0 | 2Y |
| 1Y | 1X | 0 | 2X |
| 1Y | 1Y | 2Y | 0 |
| 2X | 0 | 1X | 1Y |
| 2Y | 0 | 1Y | 1X |
| 0 | 2X | 1X | 1X |
| 0 | 2Y | 1Y | 1Y |
| 4X | 0 | 2X | 2Y |
| 4Y | 0 | 2Y | 2X |
| 2X | 2Y | 0 | 4Y |
| 2Y | 2X | 0 | 4X |
| 0 | 4X | 2X | 2X |
| 0 | 4Y | 2Y | 2Y |

In the combining section 14 of the logic stage 9 in FIG. 1, the first 4-port coupler 23 combines the intermediate signals 10, 11 to produce two transitional signals 25, 26. The first intermediate signal 10 is directed into the first input port of the first 4-port coupler 23 and the second intermediate signal 11 is directed into the second input port of the first 4-port coupler 23. The first transitional signal 25 is produced at the first output port of the first 4-port coupler 23 and the second transitional signal 26 is produced at the second output port of the first 4-port coupler 23. Table 8 summarizes the input and output signals of the first 4-port coupler 23 for an OR logic function.

TABLE 8

| First Intermediate Signal 10 | Second Intermediate Signal 11 | First Transitional Signal 25 | Second Transitional Signal 26 |
|---|---|---|---|
| 2X | 0 | 1X | 1Y |
| 1X | 1Y | 0 | 2Y |
| 1X | 1Y | 0 | 2Y |
| 0 | 2Y | 1Y | 1Y |

The two transitional signals 25, 26 are then directed into the fifth 3-port coupler 24, which combines them to produce the combined signal 27. The first transitional signal 25 is directed into the first input port of the fifth 3-port coupler 24 and the second transitional signal 26 is directed into the second input port of the fifth 3-port coupler 24 to produce the combined signal 27. Table 9 summarizes the input and output signals of the fifth 3-port coupler 24 for an OR logic function.

TABLE 9

| First Transitional Signal 25 | Second Transitional Signal 26 | Combined Signal 27 |
|---|---|---|
| 1X | 1Y | 0 |
| 0 | 2Y | 2Y |
| 0 | 2Y | 2Y |
| 1Y | 1Y | 2Y |

The combined signal 27 is then directed into the magnitude shifting section 15. The combined signal 27 and the third control input signal 6 are combined in a sixth 3-port coupler 28. The third control input signal 6 is preferably equal in magnitude and phase to the first control input signal 4. The combined signal 27 is directed into the first input port of the sixth 3-port coupler 28 and the third control input signal 6 is directed into the second input port of the sixth 3-port coupler 28 to produce the data output signal 7 at the output port of the sixth 3-port coupler 28. For example, for an OR logic function, the third control input signal 6 is 1X. Table 10 summarizes the input and output signals of the sixth 3-port coupler 28 for an OR logic function.

TABLE 10

| Combined Signal 27 | Third Control Input Signal 6 | Data Output Signal 7 |
|---|---|---|
| 0 | 1X | 1X |
| 2Y | 1X | 1Y |

TABLE 10-continued

| Combined Signal 27 | Third Control Input Signal 6 | Data Output Signal 7 |
|---|---|---|
| 2Y | 1X | 1Y |
| 2Y | 1X | 1Y |

The data output signal 7 has a constant magnitude and has one of two relative phase values that is related to the data input signals 2, 3 by the OR Boolean logic function. The data input and data output signals of the device 1 are summarized in Table 11 for an OR logic function using 1X defined as logical OFF and 1Y defined as logical ON.

TABLE 11

| First Data Input Signal 2 | | Second Data Input Signal 3 | | Data Output Signal 7 | |
|---|---|---|---|---|---|
| 1X | OFF | 1X | OFF | 1X | OFF |
| 1X | OFF | 1Y | ON | 1Y | ON |
| 1Y | ON | 1X | OFF | 1Y | ON |
| 1Y | ON | 1Y | ON | 1Y | ON |

OR Logic Function Operation Summary

The logic value of the data output signal 7 is directly related to the logic values of the data input signals 2, 3 by the logic function of the device 1. The control inputs 4, 5, 6 are used to set the logic function of the device 1. In the above example, the device 1 performs an OR logic function by setting the first control input signal 4 to 1X, the second control input signal 5 to 1Y, and the third control input signal 6 to 1X. The example signals of the device 1 for an OR logic function are summarized in Table 12 and Table 13. Table 12 summarizes the device 1 signals in the mixing stage 8.

TABLE 12

| First Data Input Signal 2 | Second Data Input Signal 3 | Merged Signal 16 | First Cross-Over Signal 17 | First Control Input Signal 4 | First Intermediate Signal 10 | Second Cross-Over Signal 18 | Second Control Input Signal 5 | Second Intermediate Signal 11 |
|---|---|---|---|---|---|---|---|---|
| 1X | 1X | 2X | 1X | 1X | 2X | 1X | 1Y | 0 |
| 1X | 1Y | 0 | 0 | 1X | 1X | 0 | 1Y | 1Y |
| 1Y | 1X | 0 | 0 | 1X | 1X | 0 | 1Y | 1Y |
| 1Y | 1Y | 2Y | 1Y | 1X | 0 | 1Y | 1Y | 2Y |

Table 13 summarizes the device 1 example signals in the logic stage 9.

TABLE 13

| First Intermediate Signal 10 | Second Intermediate Signal 11 | First Transitional Signal 25 | Second Transitional Signal 26 | Combined Signal 27 | Third Control Input Signal 6 | Data Output Signal 7 |
|---|---|---|---|---|---|---|
| 2X | 0 | 1X | 1Y | 0 | 1X | 1X |
| 1X | 1Y | 0 | 2Y | 2Y | 1X | 1Y |
| 1X | 1Y | 0 | 2Y | 2Y | 1X | 1Y |
| 0 | 2Y | 1Y | 1Y | 2Y | 1X | 1Y |

The data input and data output signals of the device 1 are summarized in Table 14 for an OR logic function using 1X defined as logical OFF and 1Y defined as logical ON.

TABLE 14

| First Data Input Signal 2 | | Second Data Input Signal 3 | | Data Output Signal 7 | |
|---|---|---|---|---|---|
| 1X | OFF | 1X | OFF | 1X | OFF |
| 1X | OFF | 1Y | ON | 1Y | ON |
| 1Y | ON | 1X | OFF | 1Y | ON |
| 1Y | ON | 1Y | ON | 1Y | ON |

AND Logic Function Operation Summary

The configuration of components used for an OR logic function can also be used for an AND logic function. The AND logic function is obtained by setting the first control input signal 4 to 1Y, the second control input signal 5 to 1X, and the third control input signal 6 to 1Y. The signals of the device 1 for an AND logic function are summarized in Table 15 and Table 16. Table 15 summarizes the device 1 example signals in the mixing stage 8.

TABLE 15

| First Data Input Signal 2 | Second Data Input Signal 3 | Merged Signal 16 | First Cross-Over Signal 17 | First Control Input Signal 4 | First Intermediate Signal 10 | Second Cross-Over Signal 18 | Second Control Input Signal 5 | Second Intermediate Signal 11 |
|---|---|---|---|---|---|---|---|---|
| 1X | 1X | 2X | 1X | 1Y | 0 | 1X | 1X | 2X |
| 1X | 1Y | 0 | 0 | 1Y | 1Y | 0 | 1X | 1X |
| 1Y | 1X | 0 | 0 | 1Y | 1Y | 0 | 1X | 1X |
| 1Y | 1Y | 2Y | 1Y | 1Y | 2Y | 1Y | 1X | 0 |

Table 16 summarizes the device 1 example signals in the logic stage 9.

TABLE 16

| First Intermediate Signal 10 | Second Intermediate Signal 11 | First Transitional Signal 25 | Second Transitional Signal 26 | Combined Signal 27 | Third Control Input Signal 6 | Data Output Signal 7 |
|---|---|---|---|---|---|---|
| 0 | 2X | 1X | 1X | 2X | 1Y | 1X |
| 1Y | 1X | 0 | 2X | 2X | 1Y | 1X |
| 1Y | 1X | 0 | 2X | 2X | 1Y | 1X |
| 2Y | 0 | 1Y | 1X | 0 | 1Y | 1Y |

The data input and data output signals of the device 1 are summarized in Table 17 for an AND logic function using 1X defined as logical OFF and 1Y defined as logical ON.

TABLE 17

| First Data Input Signal 2 | | Second Data Input Signal 3 | | Data Output Signal 7 | |
|---|---|---|---|---|---|
| 1X | OFF | 1X | OFF | 1X | OFF |
| 1X | OFF | 1Y | ON | 1X | OFF |
| 1Y | ON | 1X | OFF | 1X | OFF |
| 1Y | ON | 1Y | ON | 1Y | ON |

4-port Coupler Logic Variations

The 4-port coupler 23 in the combining section 14 of the logic stage 9 can be flipped so that the first and second input ports are switched and the first intermediate signal 10 is directed into the second input port of the 4-port coupler 23 and the second intermediate signal 11 is directed into the first input port of the 4-port coupler 23. This results in the second transitional signal 26, the combined signal 27, and the third control input signal 6 being inverted, compared to the second transitional signal 26, the combined signal 27, and the third control input signal 6 in the logic stage 9 of the OR logic function shown in Table 13. As a result, the device 1 performs an AND logic function. Table 18 summarizes the resulting device 1 signals in the logic stage 9 employing a flipped 4-port coupler 23 and using the intermediate signals 10, 11 produced by the mixing stage 8, as listed in Table 12.

TABLE 18

| First Intermediate Signal 10 | Second Intermediate Signal 11 | First Transitional Signal 25 | Second Transitional Signal 26 | Combined Signal 27 | Third Control Input Signal 6 | Data Output Signal 7 |
|---|---|---|---|---|---|---|
| 0 | 2X | 1X | 1X | 2X | 1Y | 1X |
| 1Y | 1X | 0 | 2X | 2X | 1Y | 1X |
| 1Y | 1X | 0 | 2X | 2X | 1Y | 1X |
| 2Y | 0 | 1Y | 1X | 0 | 1Y | 1Y |

A phase inverter can also be placed on any signal in the device 1 to provide a specific logic function. For example, an inverter is placed preferably to receive the data output signal 7, thereby producing the NOR and NAND logic functions.

Second Embodiment

Figure 5:
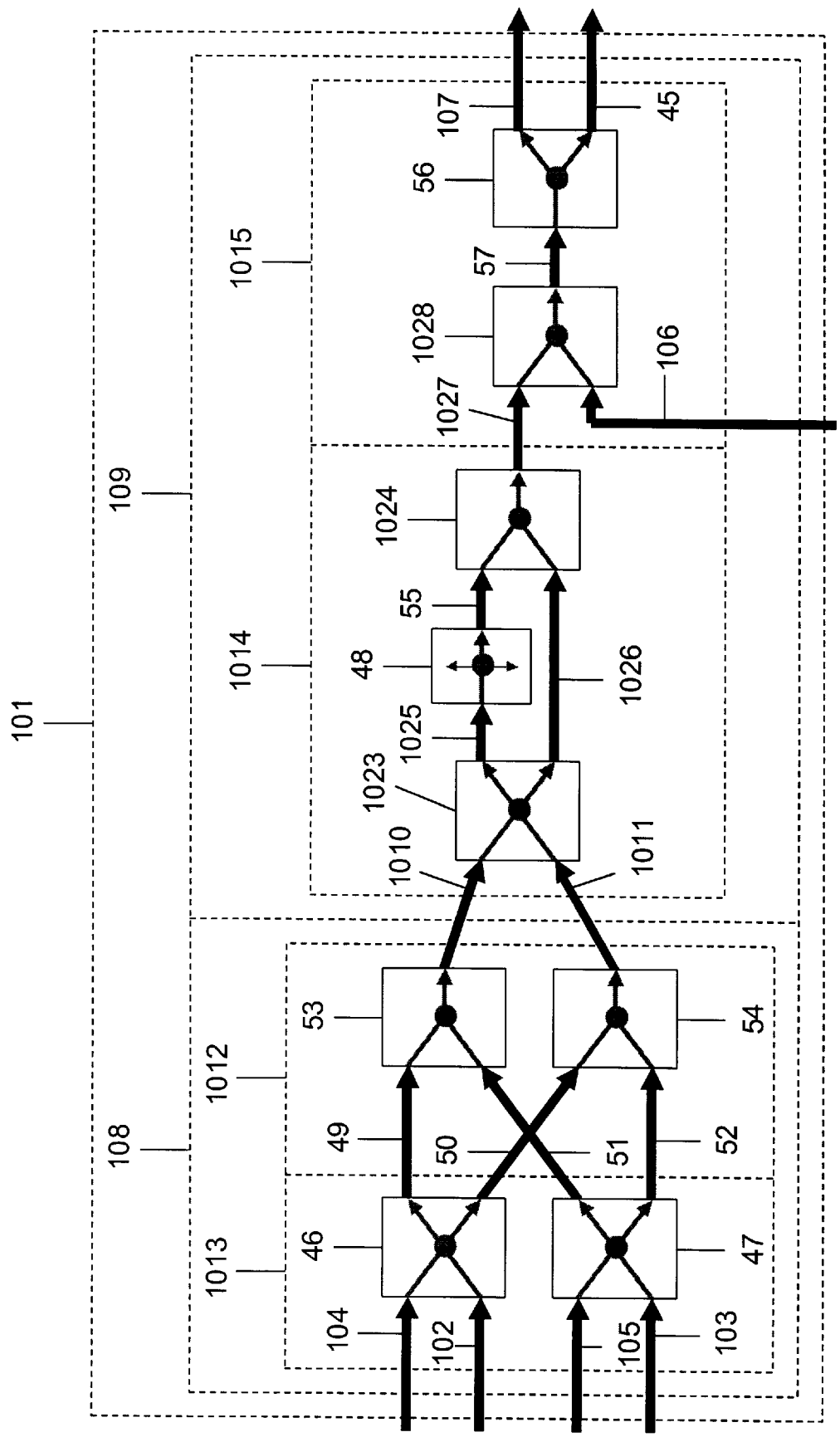
FIG. 5 is an alternative embodiment of FIG. 1.

In an alternative embodiment of the device 1, two data output signals 107, 45 are generated by a device 101, as shown in FIG. 5 where like numerals with a prefix 10 refer to similar elements of the device 1 in FIG. 1. The alternative embodiment device 101 differs from the device 1 in the following ways:

1. the order of a cross-over section 1012 and a transferring section 1013, in a mixing stage 108, is reversed so that the transferring section 1013 precedes the cross-over section 1012,
2. 4-port couplers 46, 47 are used in the transferring section 1013,
3. a third control input signal 106 is twice the magnitude of a first control input signal 104 and a second control input signal 105,
4. a phase inverter 48 is used in a combining section 1014 of a logic stage 109 to invert the logic function of the device 1 from OR and AND to NAND and NOR, respectively, and
5. the two data output signals 107, 45 are produced using a fifth 3-port coupler 56 operating as a splitter in a magnitude shifting section 1015.

In the first stage, the mixing stage 108, first and second data input signals 102, 103 are combined with the two control input signals 104, 105 and then intermixed with each other to produce two intermediate signals 1010, 1011. The mixing stage 108 is composed of a transferring section 1013 and a cross-over section 1012.

In the transferring section 1013 of the mixing stage 108, the data input signals 102, 103 are modified using the first two control input signals 104, 105. Each data input signal 102, 103 is combined with one of the control input signals 104, 105 using a first 4-port coupler 46 and a second 4-port coupler 47, that are similar in design to the 4-port coupler 23 of the previous embodiment, to produce four transfer signals 49, 50, 51, 52.

In the cross-over section 1012, the first and third transfer signals 49, 51 are combined and the second and fourth transfer signals 50, 52 are combined to produce the two intermediate signals 1010, 1011. Two 3-port couplers 53, 54, similar to the 3-port couplers 19, 21, 22, 24, 28 of the previous embodiment, are used to combine the transfer signals 49, 50, 51, 52.

The intermediate signals 1010, 1011 are then directed into the logic stage 109. The logic stage 109 is composed of a combining section 1014 and the magnitude shifting section 1015.

The combining section 1014 combines the intermediate signals 1010, 1011 to produce a combined signal 1027 and consists of a third 4-port coupler 1023, similar to the 4-port couplers 46, 47 in the transferring section 1013, the phase inverter 48, and a third 3-port coupler 1024, similar to the 3-port couplers 53, 54, in the cross-over section 1012.

In the magnitude shifting section 1015, the combined signal 1027 is combined with the third control input signal 106 using a fourth 3-port coupler 1028, thereby producing a doubled data output signal 57 that is twice the magnitude of the data input signals 102, 103. The fifth 3-port coupler 56, operating as a signal splitter, is used to split the doubled data output signal 57 into the two equal data output signals 107, 45.

Input Signals

Table 19 shows the four possible combinations, or states, of the data input signals 102, 103 for the device 101 in this example where 1X is defined as logical OFF and 1Y is defined as logical ON.

TABLE 19

| First Data Input Signal 102 | | Second Data Input Signal 103 | |
|---|---|---|---|
| 1X | OFF | 1X | OFF |
| 1X | OFF | 1Y | ON |
| 1Y | ON | 1X | OFF |
| 1Y | ON | 1Y | ON |

Stage 1—Mixing Stage

In the transferring section 1013, the first 4-port coupler 46 combines the first data input signal 102 with the first control input signal 104 to produce the first transfer signal 49 and the second transfer signal 50. The first control input signal 104 is preferably equal in magnitude to the first data input signal 102. The first control input signal 104 is directed into the first input port of the first 4-port coupler 46 and the first data input signal 102 is directed into the second input port of the first 4-port coupler 46. The first transfer signal 49 is produced at the first output port of the first 4-port coupler 46 and the second transfer signal 50 is produced at the second output port of the first 4-port coupler 46. For example, in a NAND logic function the first control input signal 104 is 1X. Table 20 summarizes the input and output signals of the first 4-port coupler 46 for a NAND logic function. All four data input states are listed so that the transfer signals 49, 50 can be readily examined and used in the next step.

TABLE 20

| First Control Input Signal 104 | First Data Input Signal 102 | First Transfer Signal 49 | Second Transfer Signal 50 |
|---|---|---|---|
| 1X | 1X | 2X | 0 |
| 1X | 1X | 2X | 0 |
| 1X | 1Y | 0 | 2Y |
| 1X | 1Y | 0 | 2Y |

In the second 4-port coupler 47, the second data input signal 103 is combined with the second control input signal 105, which has a data value preferably equal to the first control input signal 104 and preferably equal in magnitude to the second data input signal 103, to produce the third transfer signal 51 and the fourth transfer signal 52. The second control input signal 105 is directed into the first input port of the second 4-port coupler 47 and the second data input signal 103 is directed into the second input port of the second 4-port coupler 47. The third transfer signal 51 is produced at the first output port of the second 4-port coupler 47 and the fourth transfer signal 52 is produced at the second output port of the second 4-port coupler 47. For example, in a NAND logic function the second control input signal 105 is 1X. Table 21 summarizes the input and output signals of the second 4-port coupler 47 for a NAND logic function. All four data input states are listed so that the transfer signals 51, 52 can be readily examined and used in the next step.

TABLE 21

| Second Control Input Signal 105 | Second Data Input Signal 103 | Third Transfer Signal 51 | Fourth Transfer Signal 52 |
|---|---|---|---|
| 1X | 1X | 2X | 0 |
| 1X | 1Y | 0 | 2Y |
| 1X | 1X | 2X | 0 |
| 1X | 1Y | 0 | 2Y |

The four transfer signals 49, 50, 51, 52 are then directed into the cross-over section 1012 of the mixing stage 108. The first transfer signal 49 is directed into the first input port of the first 3-port coupler 53 and the third transfer signal 51 is directed into the second input port of the first 3-port coupler 53 where they are combined to produce the first intermediate signal 1010. Table 22 summarizes the input and output signals of the first 3-port coupler 53 for a NAND logic function.

TABLE 22

| First Transfer Signal 49 | Third Transfer Signal 51 | First Intermediate Signal 1010 |
|---|---|---|
| 2X | 2X | 4X |
| 2X | 0 | 2X |
| 0 | 2X | 2X |
| 0 | 0 | 0 |

The second transfer signal 50 is directed into the first input port of the second 3-port coupler 54 and the fourth transfer signal 52 is directed into the second input port of the second 3-port coupler 54 where they are combined to produce the second intermediate signal 1011. Table 23 summarizes the input and output signals of the second 3-port coupler 54 for a NAND logic function.

TABLE 23

| Second Transfer Signal 50 | Fourth Transfer Signal 52 | Second Intermediate Signal 1011 |
|---|---|---|
| 0 | 0 | 0 |
| 0 | 2Y | 2Y |
| 2Y | 0 | 2Y |
| 2Y | 2Y | 4Y |

Stage 2—Logic Stage

In the combining section 1014 of the logic stage 109, the first intermediate signal 1010 is directed into the first input port of the third 4-port coupler 1023 and the second intermediate signal 1011 is directed into the second input port of the third 4-port coupler 1023. The 4-port coupler 1023 combines the intermediate signals 1010, 1011 to produce a first transitional signal 1025 at the first output port of the 4-port coupler 1023 and a second transitional signal 1026 at the second output port of the 4-port coupler 1023. Table 24 summarizes the input and output signals of the third 4-port coupler 1023 for a NAND logic function.

TABLE 24

| First Intermediate Signal 1010 | Second Intermediate Signal 1011 | First Transitional Signal 1025 | Second Transitional Signal 1026 |
|---|---|---|---|
| 4X | 0 | 2X | 2Y |
| 2X | 2Y | 0 | 4Y |
| 2X | 2Y | 0 | 4Y |
| 0 | 4Y | 2X | 2Y |

The first transitional signal 1025 is directed into the phase inverter 48 which produces an inverted first transitional signal 55. The phase inverter 48 is used to invert the phase of the first transitional signal 1025, thereby changing the logic function of the device 101 from OR to NAND.

Figure 6:
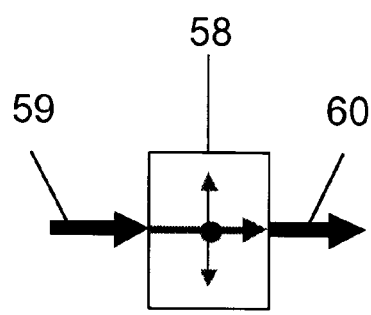
FIG. 6 is a schematic of a phase inverter of FIG. 5.

Phase inverters, such as an integral path length with a half wavelength extension, are well known in the art and are commonly used. A phase inverter 58, shown in FIG. 6, inverts the phase of an input signal 59 by inducing a 180° relative phase change so that an output signal 60 has a phase opposite to the input signal 59. For example, the input signal 59 of 1X is inverted to produce the output signal 60 of 1Y.

Table 25 summarizes the input and output signals of the phase inverter 48 in FIG. 5 for a NAND logic function.

TABLE 25

| First Transitional Signal 1025 | Inverted First Transitional Signal 55 |
|---|---|
| 2X | 2Y |
| 0 | 0 |
| 0 | 0 |
| 2Y | 2X |

The inverted first transitional signal 55 and the second transitional signal 1026 are directed into the third 3-port coupler 1024 which combines them to produce the combined signal 1027. The inverted first transitional signal 55 is directed into the first input port of the third 3-port coupler 1024 and the second transitional signal 1026 is directed into the second input port of the third 3-port coupler 1024 to produce the combined signal 1027. Table 26 summarizes the input and output signals of the third 3-port coupler 1024 for a NAND logic function.

TABLE 26

| Inverted First Transitional Signal 55 | Second Transitional Signal 1026 | Combined Signal 1027 |
|---|---|---|
| 2Y | 2Y | 4Y |
| 0 | 4Y | 4Y |
| 0 | 4Y | 4Y |
| 2X | 2Y | 0 |

The combined signal 1027 is directed into the magnitude shifting section 1015. The combined signal 1027 and the third control input signal 106 are combined in the fourth 3-port coupler 1028 to produce the doubled data output signal 57 that is twice the magnitude of the data input signals 102, 103. The third control input signal 106 has a data value that is preferably twice the magnitude of the first control input signal 104 and is preferably opposite in phase to the combined signal 1027. The combined signal 1027 is directed into the first input port of the fourth 3-port coupler 1028 and the third control input signal 106 is directed into the second input port of the fourth 3-port coupler 1028 to produce the doubled data output signal 57. For example, for a NAND logic function, the third control input signal 106 is 2X. Table 27 summarizes the input and output signals for the fourth 3-port coupler 1028 for a NAND logic function.

TABLE 27

| Combined Signal 1027 | Third Control Input Signal 106 | Doubled Data Output Signal 57 |
|---|---|---|
| 4Y | 2X | 2Y |
| 4Y | 2X | 2Y |
| 4Y | 2X | 2Y |
| 0 | 2X | 2X |

The fifth 3-port coupler 56, functioning as a signal splitter, receives the doubled data output signal 57 and splits it into the two equal data output signals 107, 45. Table 28 summarizes the fifth 3-port coupler 56 input and output signals for a NAND logic function.

TABLE 28

| Doubled Data Output Signal 57 | First Data Output Signal 107 | Second Data Output Signal 45 |
|---|---|---|
| 2Y | 1Y | 1Y |
| 2Y | 1Y | 1Y |
| 2Y | 1Y | 1Y |
| 2X | 1X | 1X |

The data input signals 102, 103 and data output signals 107, 45 of the device 101 are summarized in Table 29 for a NAND logic function using 1X defined as logical OFF and 1Y defined as logical ON.

TABLE 29

| First Data Input Signal 102 | | Second Data Input Signal 103 | | Data Output Signals 107, 45 | |
|---|---|---|---|---|---|
| 1X | OFF | 1X | OFF | 1X | ON |
| 1X | OFF | 1Y | ON | 1Y | ON |
| 1Y | ON | 1X | OFF | 1Y | ON |
| 1Y | ON | 1Y | ON | 1X | OFF |

NAND Logic Function Operation Summary

In the above example, the device 101 performs a NAND logic function by setting the first control input signal 104 to 1X, the second control input signal 105 to 1X, and the third control input signal 106 to 2X. The example signals of the device 101 for a NAND logic function are summarized in Table 30, Table 31, and Table 32. Table 30 summarizes the device 101 example signals in the mixing stage 108.

TABLE 30

| First Control Input Signal 104 | First Data Input Signal 102 | Second Control Input Signal 105 | Second Data Input Signal 103 | First Transfer Signal 49 | Third Transfer Signal 51 | First Intermediate Signal 1010 | Second Transfer Signal 50 | Fourth Transfer Signal 52 | Second Intermediate Signal 1011 |
|---|---|---|---|---|---|---|---|---|---|
| 1X | 1X | 1X | 1X | 2X | 2X | 4X | 0 | 0 | 0 |
| 1X | 1X | 1X | 1Y | 2X | 0 | 2X | 0 | 2Y | 2Y |
| 1X | 1Y | 1X | 1X | 0 | 2X | 2X | 2Y | 0 | 2Y |
| 1X | 1Y | 1X | 1Y | 0 | 0 | 0 | 2Y | 2Y | 4Y |

Table 31 summarizes the device 101 example signals in the combining section 1014 of the logic stage 109.

TABLE 31

| First Intermediate Signal 1010 | Second Intermediate Signal 1011 | First Transitional Signal 1025 | Second Transitional Signal 1026 | Inverted First Transitional Signal 55 | Combined Signal 1027 |
|---|---|---|---|---|---|
| 4X | 0 | 2X | 2Y | 2Y | 4Y |
| 2X | 2Y | 0 | 4Y | 0 | 4Y |
| 2X | 2Y | 0 | 4Y | 0 | 4Y |
| 0 | 4Y | 2Y | 2Y | 2X | 0 |

Table 32 summarizes the device 101 example signals in the magnitude shifting section 1015 of the logic stage 109.

TABLE 32

| Combined Signal 1027 | Third Control Input Signal 106 | Doubled Data Output Signal 57 | First Data Output Signal 107 | Second Data Output Signal 45 |
|---|---|---|---|---|
| 4Y | 2X | 2Y | 1Y | 1Y |
| 4Y | 2X | 2Y | 1Y | 1Y |
| 4Y | 2X | 2Y | 1Y | 1Y |
| 0 | 2X | 2X | 1X | 1X |

The data input signals 102, 103 and data output signals 107, 45 of the device 101 are summarized in Table 33 for a NAND logic function using 1X defined as logical OFF and 1Y defined as logical ON.

TABLE 33

| First Data Input Signal 102 | | Second Data Input Signal 103 | | Data Output Signals 107, 45 | |
|---|---|---|---|---|---|
| 1X | OFF | 1X | OFF | 1Y | ON |
| 1X | OFF | 1Y | ON | 1Y | ON |
| 1Y | ON | 1X | OFF | 1Y | ON |
| 1Y | ON | 1Y | ON | 1X | OFF |

NOR Logic Function Operation Summary

The configuration of components used for the NAND logic function can also be used for a NOR logic function. The NOR logic function is obtained by setting the first control input signal 104 to 1Y, the second control input signal 105 to 1Y, and the third control input signal 106 to 2Y. The example signals of the device 101 for a NOR logic function are summarized in Table 34, Table 35, and Table 36. Table 34 summarizes the device 101 example signals in the mixing stage 108.

TABLE 34

| First Control Input Signal 104 | First Data Input Signal 102 | Second Control Input Signal 105 | Second Data Input Signal 103 | First Transfer Signal 49 | Third Transfer Signal 51 | First Intermediate Signal 1010 | Second Transfer Signal 50 | Fourth Transfer Signal 52 | Second Intermediate Signal 1011 |
|---|---|---|---|---|---|---|---|---|---|
| 1Y | 1X | 1Y | 1X | 0 | 0 | 0 | 2X | 2X | 4X |
| 1Y | 1X | 1Y | 1Y | 0 | 2Y | 2Y | 2X | 0 | 2X |
| 1Y | 1Y | 1Y | 1X | 2Y | 0 | 2Y | 0 | 2X | 2X |
| 1Y | 1Y | 1Y | 1Y | 2Y | 2Y | 4Y | 0 | 0 | 0 |

Table 35 summarizes the device 101 example signals in the combining section 1014 of the logic stage 109.

TABLE 35

| First Intermediate Signal 1010 | Second Intermediate Signal 1011 | First Transitional Signal 1025 | Second Transitional Signal 1026 | Inverted First Transitional Signal 55 | Combined Signal 1027 |
|---|---|---|---|---|---|
| 0 | 4X | 2X | 2X | 2Y | 0 |
| 2Y | 2X | 0 | 4X | 0 | 4X |
| 2Y | 2X | 0 | 4X | 0 | 4X |
| 4Y | 0 | 2Y | 2X | 2X | 4X |

Table 36 summarizes the device 101 example signals in the magnitude shifting section 1015 of the logic stage 109.

TABLE 36

| Combined Signal 1027 | Third Control Input Signal 106 | Doubled Data Output Signal 57 | First Data Output Signal 107 | Second Data Output Signal 45 |
|---|---|---|---|---|
| 0 | 2Y | 2Y | 1Y | 1Y |
| 4X | 2Y | 2X | 1X | 1X |

TABLE 36-continued

| Combined Signal 1027 | Third Control Input Signal 106 | Doubled Data Output Signal 57 | First Data Output Signal 107 | Second Data Output Signal 45 |
|---|---|---|---|---|
| 4X | 2Y | 2X | 1X | 1X |
| 4X | 2Y | 2X | 1X | 1X |

The data input signals 102, 103 and data output signal 107, 45 of the device 101 are summarized in Table 37 for a NOR logic function using 1X defined as logical OFF and 1Y defined as logical ON.

TABLE 37

| First Data Input Signal 102 | | Second Data Input Signal 103 | | Data Output Signals 107, 45 | |
|---|---|---|---|---|---|
| 1X | OFF | 1X | OFF | 1Y | ON |
| 1X | OFF | 1Y | ON | 1X | OFF |
| 1Y | ON | 1X | OFF | 1X | OFF |
| 1Y | ON | 1Y | ON | 1X | OFF |

The device 1 is ideally suited as a logic gate for phase logic circuits, in particular optical phase logic circuits. The device I provides all of the necessary functionality required by Boolean logic. The device 1 provides OR, AND, NAND, and NOR logic functions that are currently performed by electronic devices. Since many electronic circuits are designed using Boolean logic functions, the same circuits can be easily constructed using the device 1. This allows circuits originally designed for electronic devices to be readily converted to phase logic circuits, such as optics, using the device 1.

Dynamic Operation

The device 1 logic function is determined by the control input signals 4, 5, 6 and can be changed dynamically during operation.

Figure 7A:
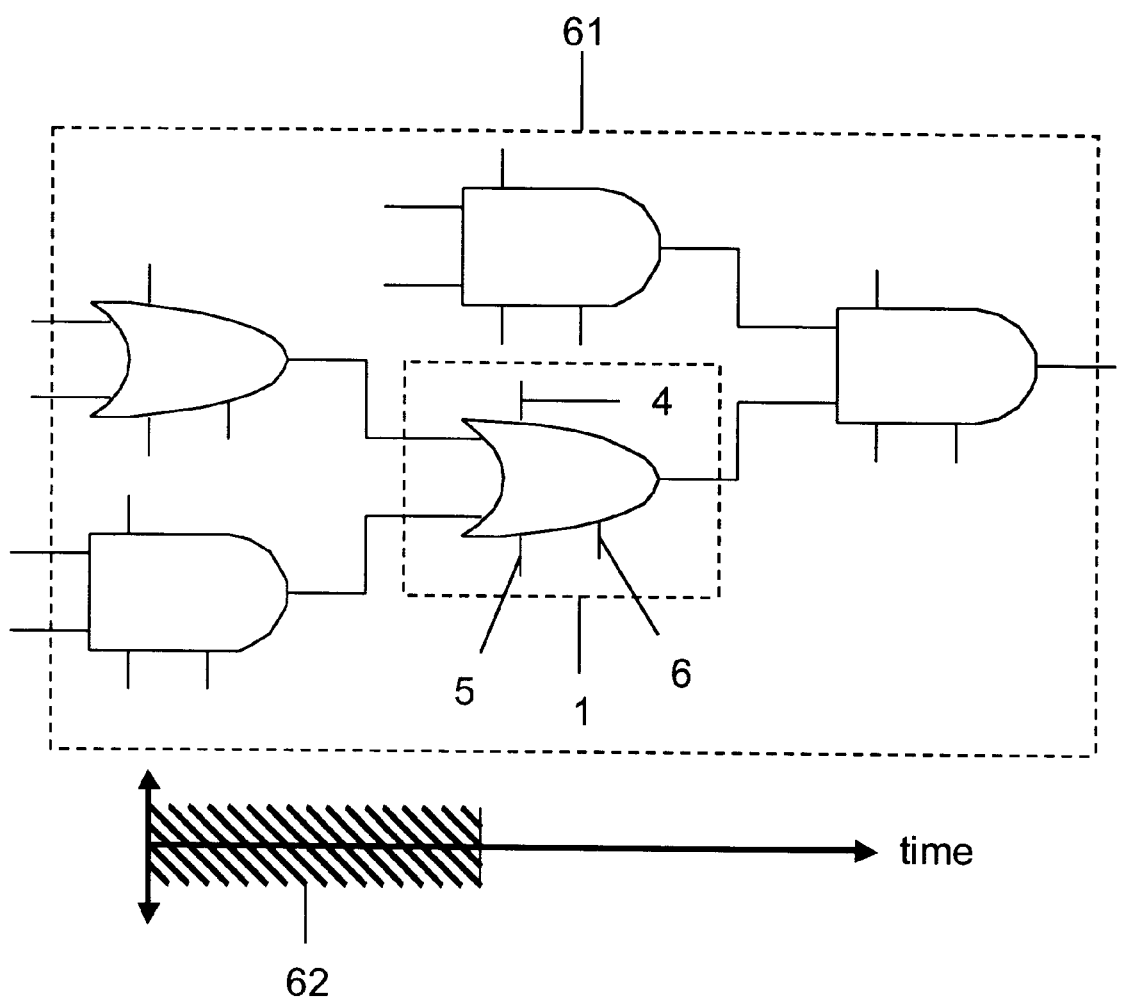
FIG. 7 shows example dynamic operation of the device of FIG. 1.
Figure 7B:
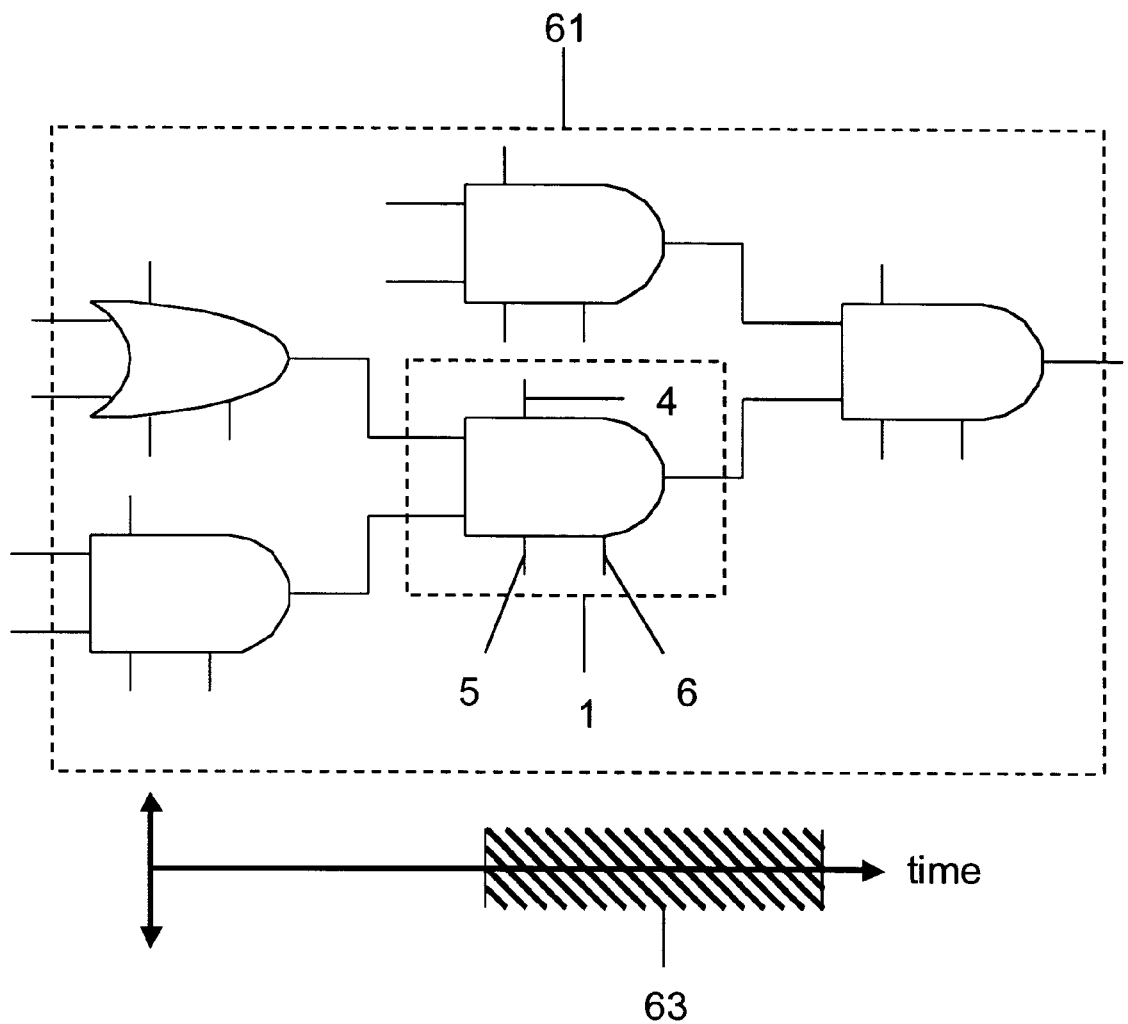

In static operation, the device 1 can be programmed to function as a dedicated logic gate, such as an OR gate or an AND gate, by selecting the data values of the control input signals 4, 5, 6. However, by changing the control input signals 4, 5, 6 during operation, the logic function of the device 1 can be dynamically programmed as desired. For example, when placed in a circuit 61, as shown in FIG. 7, the device 1 can be used as an OR Gate, as shown in Table 14 and FIG. 7A, for a measured time period 62. Then, the data values of the control input signals 4, 5, 6 can be changed, reprogramming the device 1 to function as an AND gate, as shown in Table 17 and FIG. 7B, for a subsequent time period 63. The device 1 logic function can be changed, as desired, during the circuit operation, hence providing the dynamic and programmable functionality of the device 1.

Optical Coupler-Based Programmable Phase Logic Device

Figure 8:
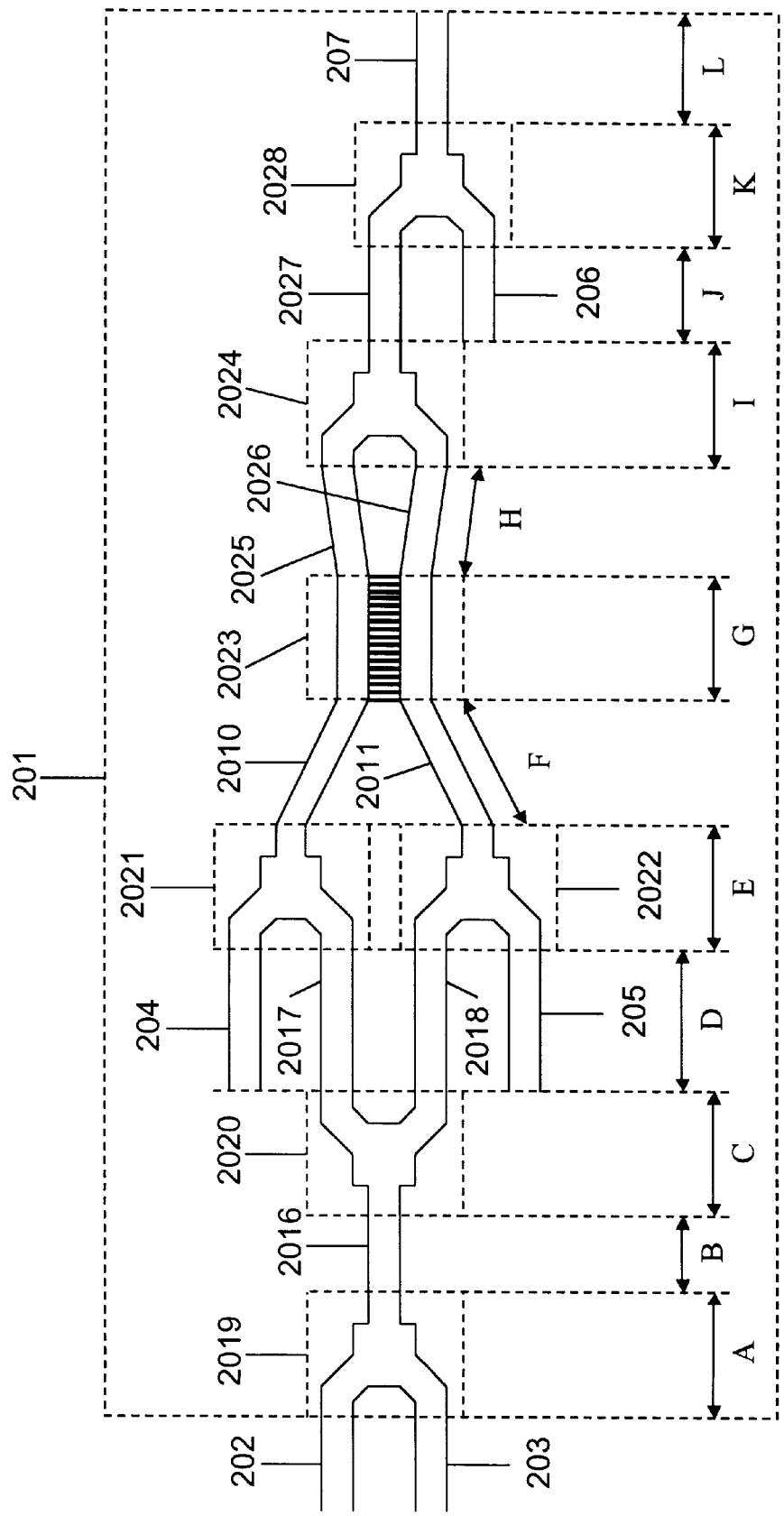
FIG. 8 is a design example of FIG. 1.

An integrated optic embodiment of the device 1 employs commonly available integrated optic components and operates using laser beams, preferably. A design example device 201 is shown in FIG. 8 where like numerals with a prefix 20 refer to similar elements of the device 1 in FIG. 1. The design example device 201 uses laser light with a wavelength of 0.85 $\mu$m. The component dimensions are listed in Table 38.

TABLE 38

| Component | Length |
|---|---|
| A | 100.0 $\mu$m |
| B | 50.0 $\mu$m |

TABLE 38-continued

| Component | Length |
|---|---|
| C | 100.0 $\mu$m |
| D | 50.0 $\mu$m |
| E | 100.0 $\mu$m |
| F | 50.0 $\mu$m |
| G | 157.1 $\mu$m |
| H | 42.9 $\mu$m |
| I | 100.0 $\mu$m |
| J | 50.0 $\mu$m |
| K | 100.0 $\mu$m |
| L | 50.0 $\mu$m |

An integrated optic directional coupler 2023 is used for the 4-port coupler 23 in the combining section of the logic stage and integrated optic modified Y-branches 2019, 2020, 2021, 2022, 2024, 2028, such as those described in U.S. Pat. No. 5,410,625, are used for the 3-port couplers 19, 20, 21, 22, 24, 28. Interconnecting rib waveguides 202, 203, 2016, 204, 2017, 2018, 205, 2010, 2011, 2025, 2026, 2027, 206, 207 are used to direct signals from component to component, are composed of $Al_{0.3}Ga_{0.7}As$ and $Al_{0.8}Ga_{0.2}As$ with air on top, and have an effective index of refraction of 3.247. The directional coupler 2023 and the modified Y-branches 2019, 2020, 2021, 2022, 2024, 2028 are also composed of $Al_{0.3}Ga_{0.7}As$ and $Al_{0.8}Ga_{0.2}As$ and have an effective index of refraction of 3.247 in this design example. The directional coupler 2023 has a coupling coefficient of 0.005 $\mu m^{-1}$.

The length of each interconnecting waveguide 2016, 204, 2017, 2018, 205, 2010, 2011, 2025, 2026, 2027, 206, 207, as indicated by B, D, F, H, J, and L, is an integral number of wavelengths so that they do not invert the phase of any signal. For example, the number of wavelengths for the merged signal waveguide 2016 is $$\frac{3.247}{0.85\ \mu m}(50.0\ \mu m) = 191\ \text{wavelengths}$$

where 3.247 is the effective refractive index of the merged signal waveguide 2016 and 0.85 $\mu$m is the wavelength of light used.

The design example device 201 is capable of operating at high speeds compared to traditional electronic semiconductor devices. The time required for the signals to traverse each component in the device is calculated using $$\frac{\eta \cdot L}{c} = \text{time}$$

where $\eta$ is the effective refractive index of each component, L is the distance the light travels in the component, and c is the speed of light in a vacuum (2.99792458×10$^8$ m/sec). The signal travel time from the input waveguides 202, 203 to the output waveguide 207, indicated by the distance A, B, C, D, E, F, G, H, I, J, K, and L, is 10.29 picoseconds which represents a switching rate of 97.19 gigahertz.

Although the invention has been described with reference to certain specific embodiments, various modifications thereof will be apparent to those skilled in the art without departing from the spirit and scope of the invention as outlined in the claims appended hereto.

I claim:

1. A phase logic device for use with coherent periodic waveforms comprising:
   a) a first data input signal and a second data input signal, wherein said data input signals are coherent signals;
   b) a first control input signal, a second control input signal, and a third control input signal, wherein said control input signals are coherent signals for regulating the predetermined logic operation of said device;
   c) a mixing stage for receiving said data input signals, said first and second control input signals, and producing a first intermediate signal and a second intermediate signal that have three unique states; and
   d) a logic stage for receiving said intermediate signals and said third control input signal and producing at least one coherent data output signal, wherein the phase value of each said input signal and said at least one output signal is selected from a set containing at least two phase values.

2. A phase logic device according to claim 1, wherein said three unique states of said intermediate signals comprise:
   a) two substantially equal states wherein said intermediate signals are substantially equal in magnitude;
   b) one state wherein said first intermediate signal is substantially larger in magnitude than said intermediate signals in said two substantially equal states and said second intermediate signal is substantially negligible; and
   c) one state wherein said first intermediate signal is substantially negligible and said second intermediate signal is substantially larger in magnitude than said intermediate signals in said two substantially equal states.

3. A phase logic device according to claim 1, wherein all said signals are coherent optic beams.

4. A phase logic device according to claim 1, wherein all said signals are coherent microwave signals.

5. A phase logic device according to claim 1, wherein all said signals are phase modulated to have one of two phase values.

6. A phase logic device according to claim 1, wherein all said signals are substantially equal in frequency.

7. A phase logic device according to claim 1, wherein a form of all said signals is selected from the group comprising continuous signals and pulsed signals.

8. A phased logic device according to claim 1, wherein said two intermediate signals are substantially opposite in phase.

9. A phase logic device according to claim 1, wherein said two intermediate signals are substantially equal in phase.

10. A phase logic device according to claim 1, wherein said two data input signals are substantially opposite in phase.

11. A phase logic device according to claim 1, wherein said two data input signals are substantially equal in phase.

12. A phase logic device according to claim 1, wherein said first control input signal is varied for providing a predetermined logic function of said device.

13. A phase logic device according to claim 1, wherein said second control input signal is varied for providing a predetermined logic function of said device.

14. A phase logic device according to claim 1, wherein said third control input signal is varied for providing a predetermined logic function of said device.

15. A phase logic device according to claim 1, wherein said mixing stage is comprised of:
   a) a first 3-port coupler for receiving said data input signals, combining said data input signals, and producing a merged signal;
   b) a second 3-port coupler for receiving said merged signal, splitting said merged signal and producing a first cross-over signal and a second cross-over signal;
   c) a third 3-port coupler for receiving said first control input signal and said first cross-over signal and producing said first intermediate signal; and
   d) a fourth 3-port coupler for receiving said second control input signal and said second cross-over signal and producing said second intermediate signal.

16. A phase logic device according to claim 15, wherein said first cross-over signal and said second cross-over signal are substantially equal.

17. A phase logic device according to claim 15, wherein said mixing stage further includes at least one phase inverter for providing a predetermined logic function.

18. A phase logic device according to claim 15, wherein said 3-port couplers are integrated optic non-3dB Y-branches.

19. A phase logic device according to claim 1, wherein said mixing stage is comprised of:
   a) a first 4-port coupler for receiving said first data input signal and said first control input signal and producing a first transfer signal and a second transfer signal;
   b) a second 4-port coupler for receiving said second data input signal and said second control input signal and producing a third transfer signal and a fourth transfer signal;
   c) a first 3-port coupler for receiving said first transfer signal and said third transfer signal, combining said first and third transfer signals, and producing said first intermediate signal; and
   d) a second 3-port coupler for receiving said second transfer signal and said fourth transfer signal, combining said second and fourth transfer signals, and producing said second intermediate signal.

20. A phase logic device according to claim 19, wherein said mixing stage further includes at least one phase inverter for providing a predetermined logic function.

21. A phase logic device according to claim 19, wherein said 4-port couplers are integrated optic directional couplers.

22. A phase logic device according to claim 19, wherein said 3-port couplers are integrated optic non-3dB Y-branches.

23. A phase logic device according to claim 1, wherein said logic stage is comprised of:
   a) a first 4-port coupler for receiving said first and second intermediate signals and producing a first transitional signal and a second transitional signal;
   b) a first 3-port coupler for receiving said first transitional signal and said second transitional signal, combining said transitional signals, and producing a combined signal; and
   c) a second 3-port coupler for receiving said third control input signal and said combined signal, combining said signals, and producing said output signal.

24. A phase logic device according to claim 23, wherein said logic stage further includes at least one phase inverter for providing a predetermined logic function.

25. A phase logic device according to claim 23, wherein said 4-port coupler is an integrated optic directional coupler.

26. A phase logic device according to claim 23, wherein said 3-port couplers are integrated optic non-3dB Y-branches.

* * * * *